United States Patent Office 3,460,635
Patented Aug. 12, 1969

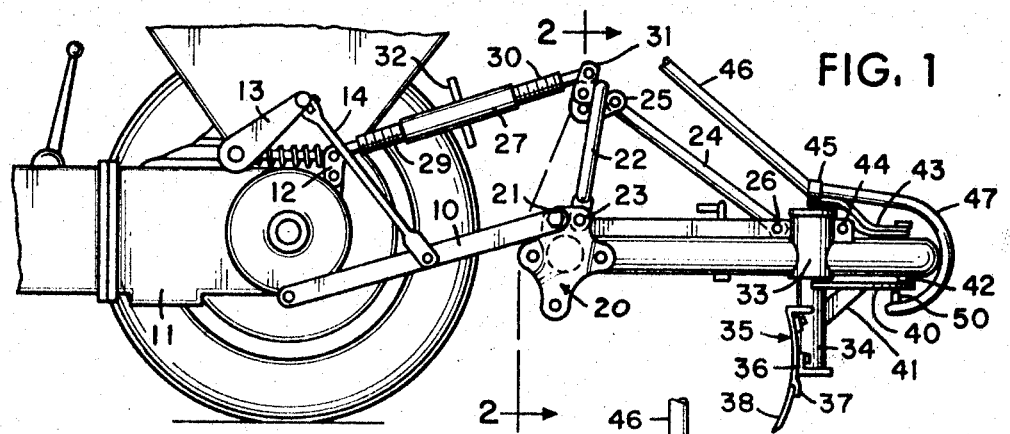
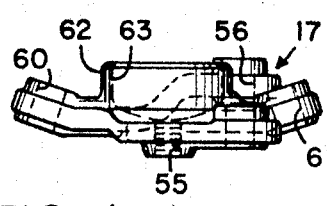
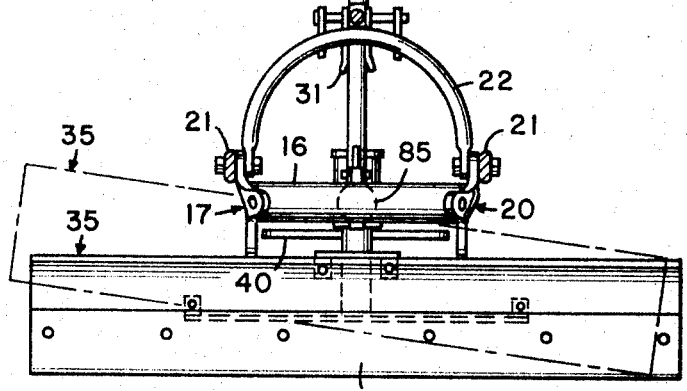
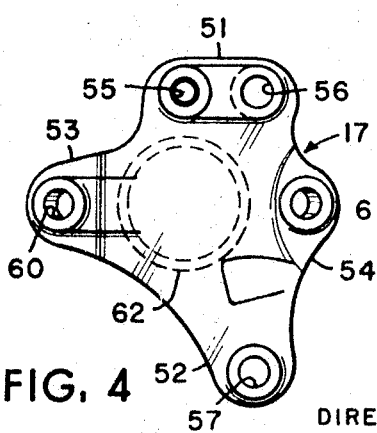
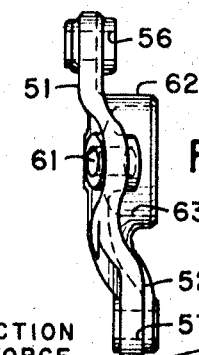
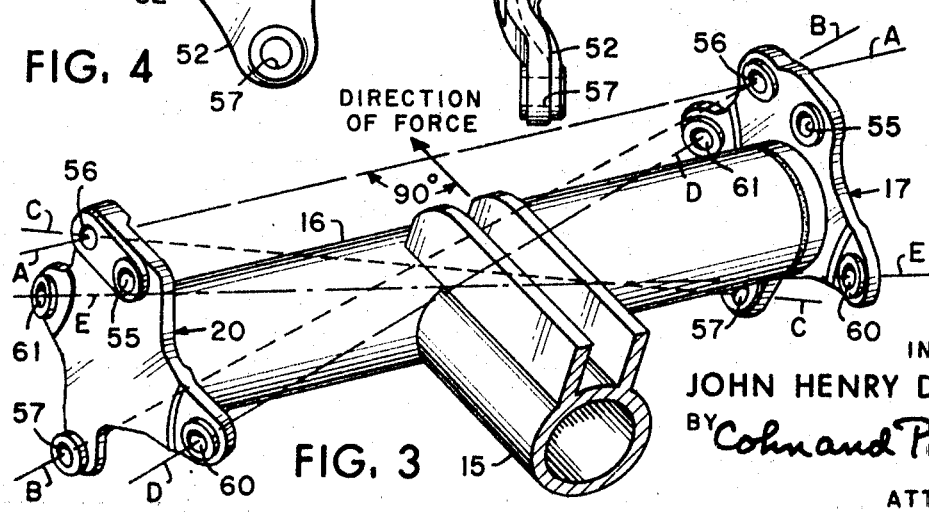

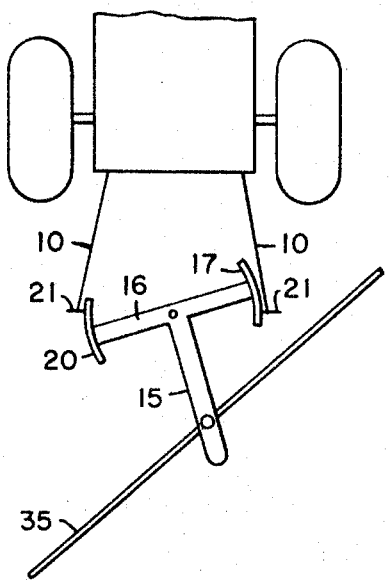
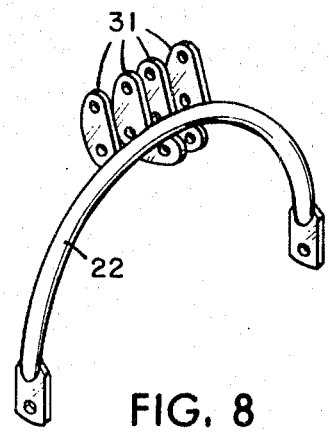

3,460,635
MULTIPLE HITCH ATTACHMENT FOR
EARTH-MOVING IMPLEMENT
John Henry Danuser, c/o Danuser Machine Company,
Fulton, Mo. 65251
Filed Aug. 25, 1965, Ser. No. 482,337
Int. Cl. A01b 65/06
U.S. Cl. 172—741                                    7 Claims

ABSTRACT OF THE DISCLOSURE

An earth-moving implement in which the frame carrying the blade includes opposed brackets, each of which is provided with a plurality of spaced connections. The spaced connections of opposed brackets are selectively alignable in pairs in the reference axis to connect the frame to the hitch means to regulate the angular disposition of the frame, and hence of the blade.

---

This invention relates generally to improvements in an earth-moving implement, and more particularly to an improved tractor attachment for grading, terracing, bulldozing, ditching and various other farm and road maintenance purposes.

An important object is achieved by the provision of specially constructed brackets on the implement frame carrying the blade, the brackets having selectively alignable connections adapted to be attached to the tractor hitch arms so that the frame can be rotated about a vertical axis, or in other words, can be angularly adjusted relative to the line of pull applied by the hitch arms, whereby the blade can be swung outwardly to either side of the tractor and hence extend the lateral reach of the blade, and so that the frame can be tilted about a longitudinal axis from one side or the other relative to the horizontal, whereby the blade can be used for cutting relatively deep narrow trenches.

Offsetting the moldboard laterally is desirable for placing the end of the moldboard outside the tractor wheel line of travel to pull material in toward the center or opposite side of the tractor. This is an advantage when blading scattered chat in from driveway shoulders or for cutting vertical banks on trench silos. This movement is, of course, in addition to movement obtained by shifting the moldboard on its mount. Also, the effect of shifting the moldboard on its mount, as used on present machines is largely lost when the moldboard is turned 45° or more about its vertical axis since it then appears as a longitudinal shift. This is not true of lateral shift obtained by relocating the link pins.

Another important objective is realized by the structural arrangement of a pair of opposed brackets, one of which is attached to each side of the implement frame, and by the provision of a plurality of connections on each bracket, the connections of opposed brackets being selectively alignable transversely in cooperating pairs adapted for selective attachment to a pair of hitch arms to regulate the angular disposition of the frame and hence of the blade relative to the horizontal, and to regulate the angular displacement of the frame relative to the direction of force applied by the hitch arms.

Still another important object is afforded in that each of the opposed brackets includes a connection that is vertically spaced relative to a connection of the other bracket when the frame and hence the blade carried thereby is horizontally disposed so that the last said connections are selectively alignable in a transverse, substantially horizontal reference axis upon attachment to the hitch arms to regulate the tilt of the frame and blade relative to the horizontal.

An important object is attained in that at least one connection of each bracket is horizontally spaced relative to a connection of the opposed bracket when the frame is aligned in the direction of force applied by the hitch arms so that the last said connections are selectively alignable in the transverse, substantially horizontal reference axis substantially perpendicular to the direction of force applied to the frame, whereby to swing the frame angularly to one side relative to the direction of force.

Another important object is realized by the construction of the opposed brackets to include substantially parallel plate portions that carry cooperating pairs of connections so that such plate portions are substantially vertical and parallel to the direction of force for more positive and effective attachment to the hitch arms, when the frame is titled from the horizontal about the longitudinal axis or when the frame is swung laterally outward from one side or the other to increase the throw or reach of the blade by turning the frame about the vertical axis.

Yet another important objective is realized by the unique construction of the bracket as an article of manufacture.

An important object is achieved by providing an earth-moving implement that is simple and durable in construction, economical to manufacture and assemble, highly efficient in operation, and which can be readily utilized by anyone with little or no instruction.

The foregoing and numerous other objects and advantages of the invention will more clearly appear from the following detailed description of a preferred embodiment, particularly when considered in connection with the accompanying drawing, in which:

FIG. 1 is a side elevational view of the earth-moving implement shown attached to the rear portion of a tractor;

FIG. 2 is a sectional view as taken along line 2—2 of FIG. 1, the blade being shown in broken lines to indicate a position obtained by turning the frame about its longitudinal axis;

FIG. 3 is a fragmentary, perspective view of the implement frame with the cooperating pairs of connections indicated by transverse reference lines;

FIG. 4 is a side elevational view of a bracket;

FIG. 5 is an end elevational view as seen from the right of FIG. 4;

FIG. 6 is a top elevational view of the bracket shown in FIG. 4;

FIG. 7 is a diagrammatic top plan view of the tractor and implement showing the frame turned about its vertical axis, and FIG. 8 is a perspective view of the yoke.

Referring now by characters of reference to the drawing, and first to FIG. 1, in which the rear parts of a tractor include as standard equipment, a pair of rearwardly projecting hitch arms 10, spaced apart and located at opposite sides of the transmission housing 11, and a top hitch link 12 located centrally and at the top rear of the housing 11. Also provided as standard equipment on this tractor is a hydraulic mechanism for raising and lowering an implement connected to the tractor by hitch arms 10, the hydraulic mechanism being disposed in the transmission housing 11 and transmitting its power to the hitch arms 10 through dual crank arms 13 and links 14. Tractors produced by a number of manufacturers are similarly provided with means for attaching and varying the operating height of appliances drawn thereby. This type of tractor is disclosed in U.S. Patent No. 2,564,355.

The implement includes a substantially T-shaped frame of tubular construction, comprising a longitudinal frame portion 15 and a transverse frame portion 16 fixedly joined to frame portion 15 at its forward end. A pair of opposed brackets 17 and 20 are identical in construction, yet reversely formed, one such bracket being fixed to each end of the transverse frame portion 16. The brackets 17 and 20 are adapted for pivotal attachment with the ends of the tractor hitch arms 10 by means of removable coupling pins 21. The lower extremities of yoke 22 are pivotally connected to the opposed brackets 17 and 20 by coupling pins 23. A diagonally extending link 24 is connected at one end to the crown of yoke 22 by a pin 25, and at its opposite end to the longitudinal frame portion 15 by a pin indicated at 26, the yoke 22 and link 24 coacting with the longitudinal frame portion 15 to constitute a triangular truss.

A longitudinally adjustable bar, consisting of a tube 27 having right and left hand threaded screw parts 29 and 30 threadedly received in its opposite ends, interconnects the tractor and the implement. These parts 29 and 30 are provided with suitable bearing eyes by which they are pinned respectively to the tractor hitch link 12 and to lugs 31 on the crown portion of the yoke 22. A hand wheel 32 fixed to the tube 27 affords means for turning the tube to vary the effective length of the composite bar.

As will be apparent from FIGS. 8–10, there are a total of four lugs 31 attached to the yoke crown, the spaced lugs 31 providing three different connections for the eye of screw part 30. This feature allows the top bar to be attached to the yoke at a point which will allow it to be more nearly parallel with the longitudinal centerline of the tractor when the frame is turned about its longitudinal axis to tilt the blade from the horizontal.

From a consideration of FIG. 1, it will appear that when lifting forces are applied to the frame through hitch arms 10, the entire implement will be elevated without substantial variation in the angular position of the frame with respect to the ground surface or with respect to the transverse, horizontal reference axis defined by the attaching ends of the hitch arms 10. Under certain circumstances a change in the angular setting of the frame is desirable and such is accomplished by manipulating the hand wheel 32 to cause the frame to pivot about the pins 21, whereby to vary the angle between the frame and hitch arms 10. The hand wheel adjustment provides for a vertical shifting of the range of movement of the rear end of the frame as afforded by the hydraulic lift mechanism, and further enables the operator to vary the angular relationship of the blade and ground surface.

The blade-supporting structure at the rear end of the longitudinal frame portion is described in detail in U.S. Patent No. 2,564,355. Briefly, the longitudinal frame portion 15 is provided with a vertical bearing housing 33 integral with the frame portion 15 and spaced from the rear extremity thereof. A vertical tool post 34 is rotatively mounted in the housing 33 and projects downwardly therefrom. The tool post 34 carries at one side of its lower end portion a blade 35 consisting of a moldboard 36 which is rigidly bolted to bracket means 37 integral with the post 34. The blade 35 is provided with a detachable edge piece 38.

The locking mechanism adapted to lock the blade structure in a variety of different angular settings is disclosed also in U.S. Patent No. 2,564,355. Briefly, the plate 40 is rigidly secured to the post 34 at a point adjacent the underside of the longitudinal frame portion 15, and is braced by an underlying diagonal strut 41. Locking pin 42 extends vertically through the frame portion 15 near the rear extremity thereof and engages the plate 40 at any one of a series of spaced openings near the edge of the plate. The pin 42 is normally biased downwardly and is adapted to be retracted upwardly out of locking engagement with the plate 40 by means of a latch lever 43 longitudinally mounted on the upper side of the frame portion 15. The latch lever 43 is pivoted to the frame portion 15 by a horizontal fulcrum pin 44, and extends forwardly therefrom to a point above the housing 33. A vertically projecting pin 45 is provided in the forward end of lever 43, such pin 45 being positioned on the lever 43 so as to be in substantial alignment with the axis of the post 34 when the lever 43 is rocked to lift the locking pin 42 out of engagement with the plate 40.

Rocking of the latch lever 43 to release the blade structure for angular adjustment is accomplished by a control lever 46 which is pivotally mounted on lever 43 by the upstanding pivot pin 45. The control lever 46 extends forwardly from its pivotal axis and is of sufficient length so as to be readily manipulated by an operator on the driver's seat of the tractor. The other arm 47 of lever 46 is curved as shown and has an upstanding finger 50 thereon which normally is spaced below the plane of plate 40.

When aligned with one of the plate openings, the finger 50 moves upwardly and enters the opening when the control lever 46 is depressed, whereby to effect an operative connection between the latch lever 43 and the blade assembly. Accordingly, horizontal shifting movement of the control lever 46 on the vertical pivot pin 45 will be transmitted to the blade assembly.

As stated previously, the brackets 17 and 20 are substantially identical in construction but reversely formed so that all parts thereof will be directly opposed when the brackets are mounted on the ends of the transverse frame portion 16. Because the construction is identical, a detailed description of one bracket will suffice for the other. Bracket 17 is shown particularly in FIGS. 4, 5 and 6.

Bracket 17 consists of a plate having an upper plate portion 51 substantially vertical and at right angles to the transverse axis defined by the transverse frame portion 16. Another lower plate portion 52 is substantially vertical and parallel to the upper plate portion 51. A front plate portion 53 is substantially vertical but is inclined inwardly in a direction toward the opposite bracket 20 and at an angle to and at one side of the transverse axis of the transverse frame portion 16. Rear plate portion 54 is substantially vertical but is inturned at an angle to and at the opposite side of the transverse axis of the transverse frame portion 16.

The bracket 17, and particularly the upper plate portion 51, is provided with a hole 55 constituting a connection to receive a coupling pin 23 in securing a lower extremity of yoke 22. The same vertical plate portion 51 is provided with another hole 56 constituting a connection to receive the coupling pin 21 in securing the end of the associated hitch arm 10. The lower plate portion 52 is provided with a hole 57 constituting a connection to receive the coupling pin 21 in securing the same end of the associated hitch arm 10. The inturned plate portion 53 is provided with a hole 60 constituting a connection to receive the coupling pin 21 in securing the same end of the associated hitch arm 10. The other inturned plate portion 54 is provided with a hole 61 constituting a connection to receive the coupling pin 21 in securing the same end of the associated hitch arm 10. The plate includes an inside hub 62 having a socket 63 receiving an end of the transverse frame portion 16.

It will be assumed that when the hitch arms 10 are attached to the associated brackets 17 and 20 by means of coupling pins 21 inserted through the bracket holes 56, the holes 56 define a transverse substantially horizontal reference axis A—A shown in FIG. 3, and the longitudinal frame portion 15 is aligned generally in the direction of force applied by the hitch arms 10 and indicated by the arrow in FIG. 3 which is substantially perpendicular to the horizontal reference axis A—A. Moreover, it will be assumed that upon attachment of the hitch arms 10 along the substantially horizontal reference axis A—A, the blade edge 38 will be disposed substantially horizontal.

It will be importantly noted that each of the holes 56, 57, 60 and 61 of one bracket 17 is spaced either vertically or horizontally with respect to at least one of such holes or connections of the other bracket 20 when the blade edge 38 is disposed horizontally and when the longitudinal frame portion 15 is aligned generally in the direction of force applied by the hitch arms 10.

For example, the holes 56 and 57 of each bracket are vertically spaced. By turning the frame about its longitudinal axis, the hitch arms 10 defining the transverse, substantially horizontal axis can be connected to the plate hole 56 of bracket 17 and to the plate hole 57 of bracket 20, whereby to tilt the blade edge 38 to one side from the horizontal. By turning the frame about its longitudinal axis in the opposite direction to connect the hitch arms 10 to the plate hole 57 of bracket 17 and plate hole 46 of bracket 20, the blade edge 38 is tilted to the opposite side from the horizontal. Thus, the blade edge 38 can be selectively adjusted to tile from the horizontal to facilitate ditching operations.

The plate holes 60 and 61 of each bracket are horizontally spaced. Each of the plate holes 60 or 61 of bracket 17 is horizontally spaced from the respective plate holes 61 and 60 of the opposed bracket 20 when the longitudinal frame portion 15 is aligned generally in the direction of force.

Furthermore, by swinging the frame in one direction about a vertical axis, the hitch arms 10 defining the transverse, substantially horizontal reference axis, can be connected to and between the plate hole 61 of bracket 17 and the plate hole 60 of bracket 20, whereby the longitudinal frame portion 15 is moved angularly to one side relative to the direction of force. By swinging the frame in the opposite direction about the vertical axis, the hitch arms 10 can be connected to and between the plate hole 60 of bracket 17 and plate hole 61 of bracket 20 whereby the longitudinal frame portion 15 is moved angularly to the opposite side relative to the direction of force. With this structural arrangement and selective adjustment, the frame can be moved angularly to one side or the other of the direction of force, and hence the blade 35 can be swung laterally outboard to increase the throw or reach of the blade.

FIG. 3 illustrates the various plate holes or connections of the opposed brackets 17 and 20 that can be operatively connected to the hitch arms 10 upon adjustment and disposition in the transverse, substantially horizontal reference axis defined by the ends of the hitch arms 10. The corresponding plate holes that can be operatively interconnected in this manner are associated by broken axis lines.

For example, connection of plate hole 56 of bracket 17 with plate hole 57 of bracket 20 is illustrated by axis line B—B. The connection of plate hole 57 of bracket 17 with plate hole 56 of bracket 20 is indicated by axis line C—C. The connection of plate hole 61 of bracket 17 with plate hole 60 of bracket 20 is indicated by axis line D—D. The connection of plate hole 60 of bracket 17 with plate hole 61 of bracket 20 is indicated by axis line E—E.

Although the invention has been described by making detailed reference to a single preferred embodiment, such detail is to be understood in an instructive, rather than in any restrictive sense.

I claim as my invention:

1. In an earth-moving implement:
   (a) a blade, and
   (b) a frame carrying the blade, the frame including opposed brackets, each of which is provided with a plurality of connections,
   (c) hitch means including a reference axis transverse to the direction of force applied to the frame,
   (d) a first connection of one bracket being selectively alignable with a corresponding first connection of the other bracket in the reference axis to connect the frame to the hitch means to maintain the blade in a first position,
   (e) at least one connection of each bracket being spaced vertically relative to a connection of the other bracket when the said first connections are connected, the said vertically spaced connections of opposed brackets being selectively alignable in the reference axis to connect the frame to the hitch means to tile the blade to the horizontal relative to the first position, and
   (f) at least one connection of each bracket being spaced horizontally relative to a connection of the other bracket when the said first connections are connected, the said horizontally spaced connections of opposed brackets being selectively alignable in the reference axis to connect the frame to the hitch means to swing the frame angularly relative to the first position.

2. In an earth-moving implement:
   (a) a blade,
   (b) a frame carrying the blade, and
   (c) hitch means including a reference axis transverse to the direction of force applied to the frame,
   (d) a pair of opposed brackets secured to each side of the frame,
   (e) each bracket including a pair of vertically spaced connections, and
   (f) one connection of one bracket being selectively alignable with each of the connections of the other bracket in the reference axis to connect the frame to the hitch means to tilt the frame and blade in two horizontally related positions.

3. In an earth-moving implement:
   (a) a frame,
   (b) hitch means including a reference axis transverse to the direction of force applied to the frame,
   (c) a blade mounted to and carried by the frame, and
   (d) a pair of opposed brackets, one of which is secured to each side of the frame,
   (e) each bracket including a pair of horizontally spaced connections, and
   (f) one connection of one bracket being selectively alignable with each of the connections of the other bracket in the reference axis to connect the frame to the hitch means to swing the frame angularly in two positions relative to the direction of force.

4. In an earth-moving implement:
   (a) a frame,
   (b) hitch means including a reference axis transverse to the direction of force on the frame,
   (c) a blade mounted to and carried by the frame, and
   (d) a pair of opposed brackets, one of which is secured to each side of the frame,
   (e) each bracket including a pair of vertically spaced connections and a pair of horizontally spaced connections,
   (f) one of the vertically spaced connections of one bracket being selectively alignable with each of the vertically spaced connections of the other bracket in the reference axis to connect the frame to the hitch means to tilt the blade in two horizontally related positions, and
   (g) one of the horizontally spaced connections of one bracket being selectively alignable with each of the horizontally spaced connections of the other bracket in the reference axis to connect the frame to the hitch means to swing the frame angularly in two positions relative to the direction of force.

5. In an earth-moving implement:
   (a) a frame,
   (b) hitch means including a reference axis transverse to the direction of force applied to the frame,
   (c) a blade mounted to and carried by the frame, and
   (d) a pair of opposed brackets, one of which is secured to each side of the frame,
   (e) each bracket including a pair of vertically spaced connections, the lower connection of each bracket being vertically spaced relative to the upper connection of the other bracket when the blade is located horizontally, and (f) each bracket including a pair of horizontally spaced connections, the forward connection of each bracket being horizontally spaced generally in the direction of force to the rear connection of the other bracket when the frame is generally aligned in the direction of force, (g) the lower connection of each bracket being selectively alignable transversely with the upper connection of the other bracket in the reference axis to connect the frame to the hitch means to tilt the blade to the horizontal, and (h) the forward connection of each bracket being selectively alignable with the rear connection of the other bracket in the reference axis to connect the frame to the hitch means to swing the frame angularly to one side relative to the direction of force.

6. In an earth-moving implement:
(a) a blade, and
(b) a frame carrying the blade, the frame including opposed brackets, each of which is provided with a plurality of spaced connections,
(c) hitch means including a substantially horizontal reference axis substantially perpendicular to the force applied to the frame,
(d) at least one connection of one bracket being vertically spaced to a connection of the other bracket when the blade is disposed substantially horizontally, the last said connections being selectively alignable in the reference axis to connect the frame to the hitch means to tilt the blade to the horizontal, and
(e) at least one connection of one bracket being spaced horizontally relative to a connection of the other bracket when the frame is aligned generally in the direction of force applied to the frame, the last said connections being selectively alignable in the reference axis to connect the frame to the hitch means to swing the frame angularly to one side relative to the direction of force.

7. In an earth-moving implement:
(a) a blade, and
(b) a frame carrying the blade, the frame including opposed brackets, each of which is provided with a plurality of connections,
(c) hitch means including a substantially horizontal reference axis substantially perpendicular to the force applied to the frame,
(d) at least one connection of one bracket being vertically spaced to a connection of the other bracket when the blade is disposed substantially horizontally, the last said connections being selectively alignable in the reference axis to tilt the blade to the horizontal, and
(e) a yoke attachable to the opposed brackets, the yoke including a plurality of transversely spaced attachment points adapted selectively to secure the hitch means in any one of a plurality of positions on the yoke when the frame is turned on its longitudinal axis incident to tilting the blade.

References Cited

UNITED STATES PATENTS

| | | | |
|---|---|---|---|
| 1,325,601 | 12/1919 | Adkins | 37—163 |
| 1,466,569 | 8/1923 | Stevens | 37—156X |
| 1,761,605 | 6/1930 | Weeks. | |
| 1,956,385 | 4/1934 | Gipford. | |
| 2,001,648 | 5/1935 | Arndt | 37—160X |
| 2,560,711 | 7/1951 | Arps | 37—156 |
| 2,564,355 | 8/1951 | Danuser | 37—159 |
| 2,716,933 | 9/1955 | Smith | 37—163X |
| 2,822,628 | 2/1958 | Arps et al. | 37—156X |

ABRAHAM G. STONE, Primary Examiner

ALAN E. KOPECKI, Assistant Examiner

U.S. Cl. X.R.

172—446